United States Patent [19]
Aldrich et al.
[11] 3,795,835
[45] Mar. 5, 1974

[54] HORIZONTAL LINEARITY CORRECTION CIRCUIT

[75] Inventors: Floyd E. Aldrich, Waterloo; Martin Fischman, Seneca Falls, both of N.Y.

[73] Assignee: GTE Sylvania Incorporated, Seneca Falls, N.Y.

[22] Filed: Sept. 8, 1972

[21] Appl. No.: 287,419

[52] U.S. Cl. .......... 315/27 TD
[51] Int. Cl. .......... H01j 29/70
[58] Field of Search .......... 315/27–29, 26

[56] References Cited
UNITED STATES PATENTS

| | | | |
|---|---|---|---|
| 3,310,705 | 3/1967 | Nicholson | 315/27 TD |
| 2,900,565 | 8/1959 | Moore | 315/27 R |
| 3,427,496 | 2/1969 | Wood | 315/27 R |
| 3,398,318 | 8/1968 | Bazin | 315/27 R |
| 3,319,111 | 5/1967 | Denton | 315/27 R |

*Primary Examiner*—Maynard R. Wilbur
*Assistant Examiner*—J. M. Potenza
*Attorney, Agent, or Firm*—Norman J. O'Malley; Cyril A. Krenzer; Thomas H. Buffton

[57] ABSTRACT

A cathode ray tube deflection circuit having a flyback transformer coupled to a potential source and via a parallel coupled horizontal output stage and a horizontal deflection yoke to a potential reference level with a damper stage coupled to the junction of the transformer means, output stage, and deflection yoke includes a linearity correction circuit wherein a winding of the transformer means coupled to a potential reference level is also coupled to a series connected switching means and series resonant circuit connected to the potential reference level and to the damper stages whereby the rate of change of current flow through a deflection yoke is altered to enhance linearity of the trace period of a cathode ray tube.

10 Claims, 8 Drawing Figures

HORIZONTAL LINEARITY CORRECTION CIRCUIT

BACKGROUND OF THE INVENTION

Generally, horizontal deflection circuitry in television receivers, monitors, and cameras tends to be non-linear due to the resistance of the horizontal deflection yoke and the loss of voltage across a transistor switch and damper stage. This non-linearity is evidenced in a television receiver by "stretching" of the image on the left portion of the viewing screen.

One known technique for combating the above-mentioned undesired non-linearity is to connect a saturable reactor in series with the circuitry of the horizontal deflection yoke. Although this circuitry offers improvement, it has been found that optimum linearity is not obtained due to changes in operating conditions, temperature, and deflection frequency. Moreover, a saturable reactor in the circuitry of the deflection yoke undesirably consumes a considerable amount of power.

Other circuitry employed in an attempt to alleviate the above-mentioned undesired non-linearity problem includes that set forth in an article entitled "Variable Damper Impedance Improves TV Scan Linearity" published Oct. 18, 1965 on page 90 of Electronics. Therein, the damper tube has the plate potential increased thereon at the beginning of each horizontal scan by a charged capacitor coupled via a diode to the winding of a flyback transformer.

In another known method, a variable resistor is connected in series with the above-mentioned diode and capacitor to provide an adjustable RC circuit. Again the charging potential of the capacitor is used to alter the potential applied to the damper stage at the beginning of horizontal scan whereby the rate of rise of current flow is reduced.

Although the above-mentioned methods have and still do provide enhanced linearity of horizontal scan of a deflection system, it has been found that each leaves something to be desired. For example, a system which has no means for adjustment is undesirably dependent upon a constant operational condition which is usually unattainable. Also, systems utilizing a resistance element present an undesirable loss of power and an undesired increase in heat. Moreover, such systems require relatively large peak current values which add greatly to the cost and reduce the reliability of both circuitry and components.

OBJECTS AND SUMMARY OF THE INVENTION

An object of the present invention is to enhance the horizontal linearity of a cathode ray tube deflection system. Another object of the invention is to enhance horizontal linearity of a cathode ray tube system without dissipation of excessive energy. Still another object of the invention is the improvement of operation of the damper stage of a television receiver at the beginning of the horizontal scan cycle.

These and other and further objects, advantages and capabilities are achieved in one aspect of the invention by a horizontal linearity correction circuit having a flyback transformer winding coupled to a potential reference level and to a series connected switching means and series resonant circuit which is, in turn, coupled to a damper stage and to a potential reference level.

PREFERRED EMBODIMENTS OF THE INVENTION

For a better understanding of the present invention, together with other and further objects, advantages and capabilities thereof, reference is made to the following disclosure and appended claims in connection with the accompanying drawings.

Figure 1:
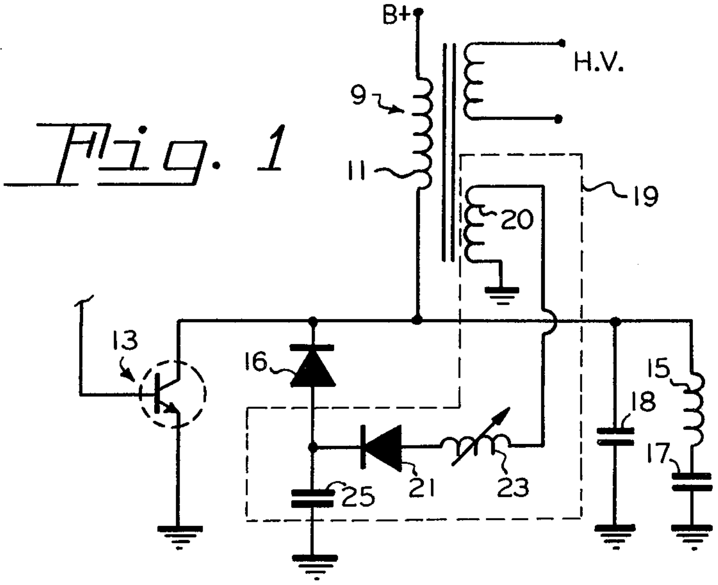
FIG. 1 illustrates a horizontal deflection system for a cathode ray tube and including one embodiment of the invention.

Referring to the drawings, FIG. 1 illustrates a horizontal deflection system which includes a linearity correction circuit. Herein, a flyback transformer 9 includes a primary winding 11 coupled to a potential source B+. A horizontal output stage 13 couples the flyback transformer 9 to a potential reference level, such as circuit ground, with a horizontal deflection yoke 15 connected in parallel with the horizontal output stage 13. Also, a damper stage 16 in the form of a diode is coupled to the junction of the flyback transformer 9 and the parallel connected horizontal output stage 13 and horizontal deflection yoke 15. Moreover, a correction capacitor 17 series couples the deflection yoke 15 to circuit ground while a tuning capacitor 18 shunts the deflection yoke 15.

A horizontal linearity circuit 19 is associated with the flyback transformer 9 and coupled to the damper stage 16 and to circuit ground. The horizontal linearity circuit 19 includes a winding 20 of the transformer 9 coupled to circuit ground and to a series connected switching means 21, in the form of a diode in this instance, and series resonant circuit including an adjustable inductor 23 and a charging capacitor 25. The series connected switching means 21 and series resonant circuit of the inductor 23 and capacitor 25 are coupled to circuit ground and to the damper stage 16.

Figure 2:
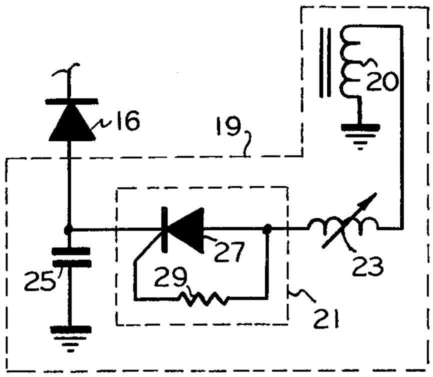

FIG. 2 illustrates an alternate embodiment of the apparatus of FIG. 1 and employs similar numbers for similar components. Herein, the horizontal linearity circuit 19 includes the winding 20 of the flyback transformer 9 coupled to the series connected series resonant circuit having an alterable inductor 23 and a charging capacitor 25 coupled to circuit ground and to a damper stage 16. Also, the switching means in series therewith is in the form of an SCR 27 with the anode coupled to the gate electrode by a resistor 29.

Figure 3:
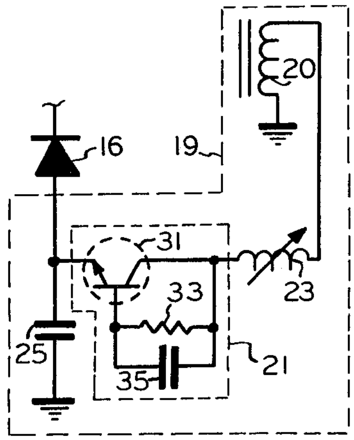
FIGS. 2–4 illustrate alternate embodiments of the invention of FIG. 1.

In another embodiment, FIG. 3 illustrates a horizontal linearity circuit 19 having a winding 20 of the flyback transformer 9 coupled to circuit ground and to the series connected series resonant circuit having an alterable inductor 23 and capacitor 25 and switching means 21 coupled to circuit ground and to a damper stage 16. The switching means 21, in this embodiment is in the form of a transistor 31 having emitter and collector electrodes coupling the series resonant circuit and a base electrode coupled by a parallel connected resistor 33 and capacitor 35 to the collector electrode of the transistor 31.

Figure 4:
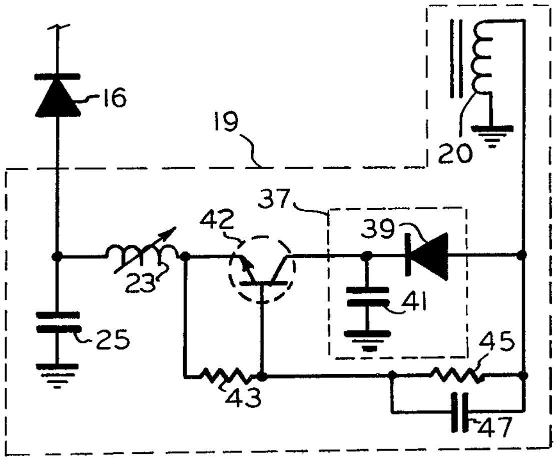

In still another embodiment, FIG. 4 illustrates a horizontal linearity circuit 19 having a winding 20 of the flyback transformer 9 coupled to circuit ground. A DC supply 37, including a diode 39 and a capacitor 41, is coupled to the winding 20 and to a switching means 21 in series with a series resonant circuit having an adjustable inductor 23 and a charging capacitor 25. A junction of the inductor 23 and capacitor 25 is coupled to a damper stage 16 while the capacitor 25 is coupled to circuit ground.

Additionally, the switching means 21 may be in the form of a diode or an SCR. As illustrated in this embodiment, the switching means 21 includes a transistor 42 having an emitter electrode coupled to the series resonant circuit, a collector electrode coupled to the DC supply 37, and a base electrode coupled by a resistor 43 to the emitter electrode and by a parallel connected resistor 45 and capacitor 47 to the winding 20 of the flyback transformer 9.

Figure 5A:
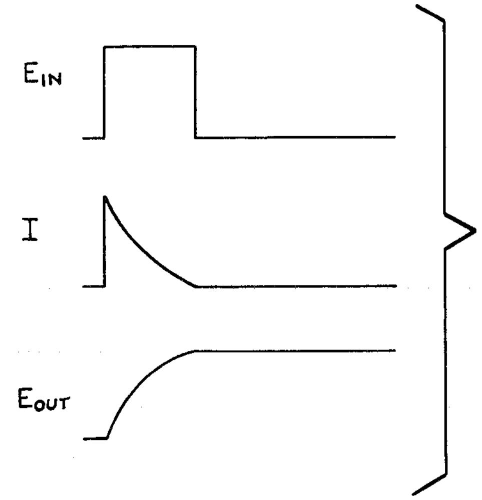
Fig. 5A PRIOR ART
FIGS. 5A and 5B are graphical comparisons of the voltages and currents available in RC and LC circuitry.
Figure 5B:
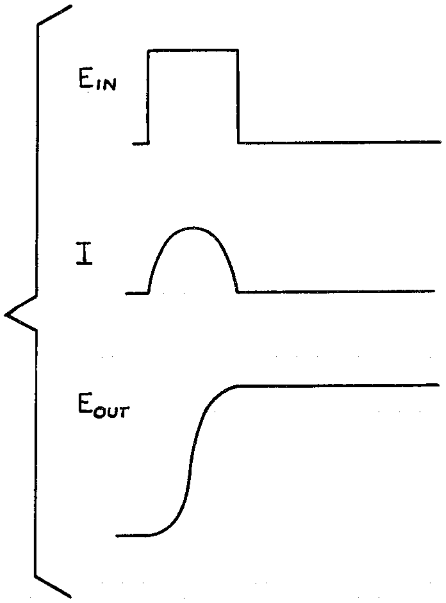

As to operation, reference is made to the graphical representation of RC and LC charging circuitry signal waveforms illustrated in FIGS. 5A and 5B. In FIG. 5A, an RC circuit would ordinarily have applied thereto a pulse-shaped input signal $E_{in}$. Such an input signal $E_{in}$ would provide a charging current, I, having the usual capacitor-resistor characteristics. Moreover, an output signal $E_{out}$, having a capacitor-resistor characteristic and a magnitude substantially equal to the magnitude of the applied signal $E_{in}$ would be available at the junction of the resistor and capacitor of the RC circuit.

Contrastingly, FIG. 5B illustrates an LC circuit having applied thereto a substantially similar pulse-shaped input signal $E_{in}$. However, in this instance the LC circuit would provide a substantially sine wave-shaped charging current I having a maximum magnitude less than the charging current I of the above-mentioned RC circuitry for a given capacitor charge. Obviously, this sine wave-shaped current I would have an increased area beneath the curve for a given maximum current indicating an increased capacitor energy content as compared with the charge current I having a capacitor-resistor characteristic in an RC circuit. Thereupon, an output signal $E_{out}$ in an LC circuit would have a magnitude of about twice the magnitude of the input signal $E_{in}$. Thus, the potential applied to the capacitor of an LC circuit is approximately twice the potential available in an RC circuit.

Figure 6A:
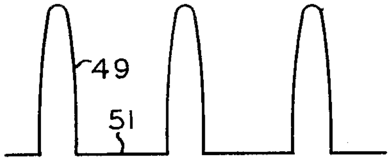
Fig. 6A PRIOR ART
FIGS. 6A and 6B illustrate a graphical comparison of uncompensated and linearily compensated yoke drive voltages.
Figure 6B:
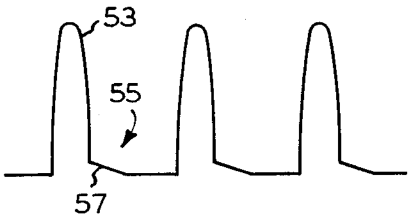

More specifically, FIG. 6A illustrates an uncompensated horizontal yoke drive potential having flyback pulse signals 49 separated by a substantially constant level of potential 51 occurring during the horizontal trace period. Moreover, FIG. 6B illustrates a linearily compensated horizontal yoke drive potential wherein flyback pulse signals 53 are separated by a horizontal trace period 55. This trace period 55 has an increased potential level 57 during an approximate initial one-third period with an enhanced linearity as observed on a cathode ray tube display.

Additionally, it is to be noted that the above-mentioned increased potential level 57 is achieved by way of the linearity circuit 19 mentioned with respect to FIGS. 1–4. Therein, the potentials $E_{out}$ illustrated in FIG. 5B are applied to and vary the potential of the damper stage 16 in a manner and of a polarity such that the potential level 57 of the trace period 55 is greatest during the initial portion of scan whereupon the linearity, as observed by a viewer of the cathode ray tube is enhanced.

Thus, there has been provided unique horizontal correction circuitry applicable to cathode ray tube deflection systems. The system not only provides adjustment of linearity correction but also increased linearity correction capability at a relatively low level of current whereupon component potential requirements are maintained or reduced and reliability is enhanced.

While there has been shown and described what is at present considered the preferred embodiments of the invention, it will be obvious to those skilled in the art that various changes and modifications may be made therein without departing from the invention as defined by the appended claims.

What is claimed is:

1. In a high voltage system having a horizontal flyback transformer means coupled to a parallel connected horizontal output stage and a horizontal deflection yoke connected intermediate a potential source and a potential reference level with a damper stage coupled to the junction of the transformer means and parallel connected output stage and deflection yoke, a horizontal linearity correction circuit comprising: a winding of said transformer means coupled to a potential reference level; and switching means and a series resonant circuit series connected intermediate said winding and a potential reference level and coupled to said damper stage whereby a potential applied to said damper effects control of current flow in said horizontal deflection yoke.

2. The linearity correction circuit of claim 1 wherein said series resonant circuit includes a series connected capacitor and adjustable inductor.

3. The linearity correction circuit of claim 1 wherein said switching means is in the form of a diode.

4. The linearity correction circuit of claim 1 wherein said switching means is in the form of an SCR in series with said series resonant circuit and having a gate electrode coupled by a resistor to said series resonant circuit.

5. The linearity correction circuit of claim 1 wherein said switching means is in the form of a transistor having emitter and collector electrodes series connected to said series resonant circuit and a base electrode coupled via a parallel connected resistor and capacitor to said series resonant circuit.

6. The linearity correction circuit of claim 1 including a DC supply coupled to said winding and to said switching means, said switching means being in the form of a transistor having emitter and collector electrodes series connected to said series resonant circuit and winding and a base electrode coupled by a resistor to said emitter and by a parallel coupled resistor and capacitor to said winding.

7. In a cathode ray tube deflection circuit having a horizontal flyback transformer means coupled to a parallel connected horizontal output stage and a horizontal deflection yoke and series connected intermediate a potential source and a potential reference level with a damper stage coupled to the junction of the transformer means and the parallel connected output stage and deflection yoke, the improvement comprising: a winding of said transformer means coupled to a potential reference level; and series connected switching means and a series resonant circuit coupling said winding to a potential reference level and connected to said damper stage to effect horizontal linearity correction of said current discharge of said deflection yoke into said damper stage.

8. The improvement of claim 7 wherein said switching means is in the form of a diode and said series resonant circuit includes a capacitor and an adjustable inductor.

9. The improvement of claim 7 wherein said series resonant circuit includes a capacitor coupled intermediate said damper stage and a potential reference level.

10. The improvement of claim 7 including a DC supply coupling said winding to said series connected switching means and series resonant circuit.

* * * * *